US008630282B2

(12) United States Patent
Tsutsumi et al.

(10) Patent No.: US 8,630,282 B2
(45) Date of Patent: Jan. 14, 2014

(54) VOICE TRANSMITTING AND RECEIVING SYSTEM

(75) Inventors: Takayuki Tsutsumi, Kawasaki (JP); Yoshikazu Kobayashi, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 4008 days.

(21) Appl. No.: 10/254,760

(22) Filed: Sep. 26, 2002

(65) Prior Publication Data

US 2003/0179745 A1    Sep. 25, 2003

(30) Foreign Application Priority Data

Mar. 22, 2002 (JP) .................................. 2002/080707

(51) Int. Cl.
*H04L 12/66* (2006.01)
*H04M 1/64* (2006.01)
*G06F 15/16* (2006.01)

(52) U.S. Cl.
USPC ........... 370/352; 370/335; 370/473; 370/532; 370/294; 379/67.1; 379/88.22; 379/88.23; 379/88.17; 709/231; 709/232; 709/247; 375/343

(58) Field of Classification Search
USPC ........... 370/352–532; 704/210; 709/231–247; 455/406, 408; 379/67.1–88.23
See application file for complete search history.

(56) References Cited

U.S. PATENT DOCUMENTS

| 4,312,074 A | * | 1/1982 | Pautler et al. ................. 375/343 |
| 4,432,089 A | * | 2/1984 | Wurzburg et al. ............ 370/294 |
| 5,675,507 A | * | 10/1997 | Bobo, II ........................ 709/206 |
| 5,696,500 A | * | 12/1997 | Diem ............................ 340/7.55 |
| 5,732,216 A | * | 3/1998 | Logan et al. .................. 709/203 |
| 5,912,958 A | * | 6/1999 | Eyran et al. ................... 379/170 |
| 5,915,001 A | * | 6/1999 | Uppaluru .................... 379/88.22 |
| 5,920,559 A | * | 7/1999 | Awaji ............................. 370/392 |
| 6,199,076 B1 | * | 3/2001 | Logan et al. ............... 715/501.1 |
| 6,240,391 B1 | * | 5/2001 | Ball et al. ....................... 704/270 |
| 6,295,342 B1 | * | 9/2001 | Kaminsky ................... 379/88.23 |
| 6,385,306 B1 | * | 5/2002 | Baxter, Jr. .................. 379/88.13 |

(Continued)

FOREIGN PATENT DOCUMENTS

| JP | 08-251229 A | 9/1996 |
| JP | 11-243437 A | 9/1999 |

(Continued)

OTHER PUBLICATIONS

C. Moorhead et al., "Resource Allocation Schemes to Provide QoS for VoIP over GPRS", First International Conference on 3G Mobile Communication Technologies, Mar. 27-29, 2000, pp. 138-142.

(Continued)

*Primary Examiner* — Ayaz Sheikh
*Assistant Examiner* — Venkatesh Haliyur
(74) *Attorney, Agent, or Firm* — Sughrue Mion, PLLC (57) ABSTRACT

Voice data from speech start till mute are transmitted as a section voice file to the opposite side voice data transmitting and receiving system, thus permitting voice data transmission free from voice interruption. By transmitting voice data from the speech start till the mute it is possible to eliminate packet losses in the data transmission channel and perform voice communication in the same voice quality as in the transmitting side. Besides, because of the use of HTTP communication port it is possible to obtain voice communication exceeding the rooter without any special setting.

14 Claims, 6 Drawing Sheets

(56) References Cited

U.S. PATENT DOCUMENTS

| | | | |
|---|---|---|---|
| 6,393,107 B1* | 5/2002 | Ball et al. | 379/88.13 |
| 6,418,199 B1* | 7/2002 | Perrone | 379/88.01 |
| 6,507,643 B1* | 1/2003 | Groner | 379/88.14 |
| 6,567,399 B1* | 5/2003 | Schuster et al. | 370/352 |
| 6,584,098 B1* | 6/2003 | Dutnall | 370/354 |
| 6,621,834 B1* | 9/2003 | Scherpbier et al. | 370/532 |
| 6,672,961 B1* | 1/2004 | Uzun | 463/31 |
| 6,731,625 B1* | 5/2004 | Eastep et al. | 370/352 |
| 6,757,256 B1* | 6/2004 | Anandakumar et al. | 370/252 |
| 6,862,568 B2* | 3/2005 | Case | 704/260 |
| 6,970,914 B1* | 11/2005 | Philyaw et al. | 709/217 |
| 6,990,529 B2* | 1/2006 | Yang et al. | 709/235 |
| 7,133,417 B1* | 11/2006 | Kao et al. | 370/467 |
| 7,139,263 B2* | 11/2006 | Miller et al. | 370/352 |
| 7,233,602 B2* | 6/2007 | Chen et al. | 370/445 |
| 2001/0040886 A1* | 11/2001 | Jimenez et al. | 370/352 |
| 2003/0002643 A1* | 1/2003 | Seibel et al. | 379/201.02 |
| 2003/0036376 A1* | 2/2003 | Annan et al. | 455/406 |
| 2003/0105804 A1* | 6/2003 | Turner et al. | 709/203 |
| 2003/0179745 A1* | 9/2003 | Tsutsumi et al. | 370/352 |
| 2003/0223553 A1* | 12/2003 | Dalrymple | 379/88.17 |

FOREIGN PATENT DOCUMENTS

| | | |
|---|---|---|
| JP | 11-331434 | 11/1999 |
| JP | 3075246 | 6/2000 |
| JP | 2000-349822 | 12/2000 |
| JP | 2001-223748 | 8/2001 |
| JP | 2001-223748 A | 8/2001 |
| JP | 2002300307 A * 10/2002 | H04M 11/00 |
| WO | WO 99/65196 A1 | 12/1999 |
| WO | WO 01/33799 A3 | 5/2001 |
| WO | WO 02/17036 A2 | 2/2002 |

OTHER PUBLICATIONS

Charles Dvorak, John Rosenberger, "Deriving a Subjective Testing Methology for Digital Circuit Multiplication and Packetized Voice Systems", IEEE Journal on Selected Areas of Communication, vol. 6, No. 2, Feb. 1988, pp. 235-241.

Bert J. Dempsey et al, "A New Error Control Scheme for Packetized Voice Over High-Speed Local Area Networks", Local Computer Networks, 1993, Proceedings, 18th Conference on Minneapolis, MN, USA, Sep. 19-22, 1993, Los Alamitos, CA, USA, IEEE Comput. Soc., Sep. 19, 1993, pp. 91-100.

Nurgün Erdöl et al, "Recovery of Missing Speech Packets Using the Short-Time Energy and Zero-Crossing Measurements", IEEE Transactions on Speech and Audio Processing, IEEE Inc. New York, US, vol. 1, No. 3, Jul. 1, 1993, pp. 293-303.

Yukuo Hayashida and Yoshikazu Tezuka, "Traffic Characteristics of the Stored-Message Transmission System", *The Transactions of the IECE of Japan*, pp. 596-603, vol. E 64, No. 7, Jul. 1981.

Maria Izabel Cavalcanti Cabrel and Jacques Phillippe Sauve, "Modeling of Dialogue Management in the Session Layer", pp. 0778-0781, *IEEE*, 1986.

Chun-Xiang Chen et al., "Throughout Analysis of ARQ Schemes in Dialogue Communication over Half-Duplex Line", *IEICE Trans. Commun.*, vol. E77-B., pp. 485-493, No. 4, Apr. 1994. Tokyo, Japan.

* cited by examiner

VOICE TRANSMITTING AND RECEIVING SYSTEM

BACKGROUND OF THE INVENTION

This application claims benefit of Japanese Patent Application No. 2002-080707 filed on Mar. 22, 2002, the contents of which are incorporated by the reference.

The present invention relates to voice data transmitting and receiving systems and, more particularly, to voice data transmitting and receiving systems with improved voice quality in voice communication via internet or like non-QoS (quality of service) guaranteed network.

As for internet communication now commonly utilized perfectly beyond country borderlines all over the world, electronic market transactions and internet telephone communication (such as IP telephone communication and internet protocol telephone communication) have been attracting attentions aside from the conventional applications such as home page reading, electronic mails and file transfer. This is greatly attributed to by quick development of networks centered on line switching in telephone network but also IP networks based on packet switching.

In the IP telephone communication, various data including voice (or FAX) data (such as still images and motion picture images) are converted to IP packets for transfer thereof in IP base network. A voice telephone services partly or fully utilizing IP network techniques is referred to IP telephone. Among the IP telephones, the voice telephone service utilizing e the same IP network as those in www therein (i.e., communication network for communication with internet protocol), is referred to as internet telephone communication.

As for the IP telephone communication, there are the following three systems. In a first system, in which voice messages are exchanged between dial-up connected personal computers, both personal computers have to install the same software to this end and be connected to the server. In a second system, in which a telephone call is made from a personal computer to a general subscriber telephone set (not vice versa), no communication can be obtained unless both sides make promises beforehand. As a third communication, in which communication is made between general subscriber telephone sets, are a system, in which communication is made by inputting user ID and PIN to the juncture between internet network in public telephone line switching system via a gateway for internet telephone, and a system for communication with direct internet-coupled terminals. These third systems are closest to the present telephone communication system, and their technical advancement is pronounced.

By the way, in voice communication in IP via an IP network such as a non-QoS (quality of service) guaranteed internet or a local network, usually voice data using RTP of UDP protocol are usually transmitted and received. In this case, voice communication and motion picture reproduction are made by using RTP with importance attached to the real time property of the data. However, the RTP has no measure against packet losses generated in the communication channel, and packets loses in the channel are no longer transmitted again, thus leading to the problems in the voice quality such as interruption of voice.

To cope with these problems, a system is proposed, in which, lest voice should be interrupted irrespective of packet losses, the data transmission is performed by adding immediately preceding and immediately succeeding packet data for execution of an interpolation process based on these data. However, in a situation that data communication other than voice is frequently brought about, voice packet losses are pronounced, and in an extreme case the voice quality is deteriorated so greatly that no conversation is obtainable even by using the interpolation.

SUMMARY OF THE INVENTION

An object of the present invention, therefore, is to provide a voice data transmitting and receiving system capable of voice data communication free from voice interruption.

Another object of the present invention is to provide voice data transmitting and receiving system capable of reducing packet losses in the data transmission channel so as to permit voice communication to be obtained with the same voice quality as in the source of transmission.

A further object of the present invention is to provide a voice data transmitting and receiving system capable of voice communication exceeding rooter without any special setting.

According to an aspect of the present invention, there is provided a voice data transmitting and receiving system for transmitting and receiving voice data as packet data via a network, wherein: on the transmitting side voice data from speech start detection till mute detection in communication voice are transmitted as one section voice file by packet switching, and on the receiving side the received voice data are voice outputted.

The voice data are transmitted with an HTTP protocol. The voice are transmitted by adding a given notification tone to the end of the voice file. On the transmitting side a predetermined header is added to the voice data, and on the receiving side only voice data, in which the predetermined header is detected, are subjected to voice processing. Voice data received during voice generation are accumulated in the recorder, and the accumulated voice data are reproduced after the end of speech. On the transmitting side the HTTP file is transmitted by adding a header defined exclusively for voice, and on the receiving side HTTP file containing voice data and other data are separated from the header in the HTTP file. A packet with an added transmission right not for making the transmission and reception of a voice file at a time but for alternate voice transmission at the end of voice file, and on the receiving side transmission is waited until a packet containing the transmission right has been received. When the voice file exceeds a predetermined length, the voice file is divided to a predetermined size and transmitted by adding a header indicative of that the pertinent voice file is a voice file division, and on the receiving side the file divisions are combined based on the header to permit voice communication free from interruption. The network is a non-QoS guaranteed network. The non-QoS guaranteed network is an internet.

According to another aspect of the present invention, there is provided a voice data transmitting and receiving system for voice data communication in IP via an IP network such as internet or LAN comprising: a voice input/output unit; a level detecting circuit for detecting speech start and mute of communication voice; a recorder for accumulating the voice data from the speech head to mute detected by the level detecting circuit as a section voice file; a packet switching part for packet switching voice data read out from the recorder; and a LAN interface unit for transmitting and receiving of packet-switched voice packets to and from an IP network.

The voice data transmitting and receiving system further comprises an HTTP control circuit for controlling data communication with an HTTP protocol, and executes HTTP file generation from voice data accumulated in the recorder based on HTTP and extraction of voice data from the HTTP file and permits HTTP communication on TCP/IP connection, thus permitting voice communication exceeding fire wall of firm channel and IP network. A given notification tone is added to the end of the voice file to notify to the opposite side of communication that the present speech is transmitted in a communication system based on the HTTP. High packet loss possibility packet data are judged as such and are re-transmitted together with a preceding packet.

Other objects and features will be clarified from the following description with reference to attached drawings.

PREFERRED EMBODIMENTS OF THE INVENTION

Preferred embodiments of the present invention will now be described with reference to the drawings.

Figure 1:
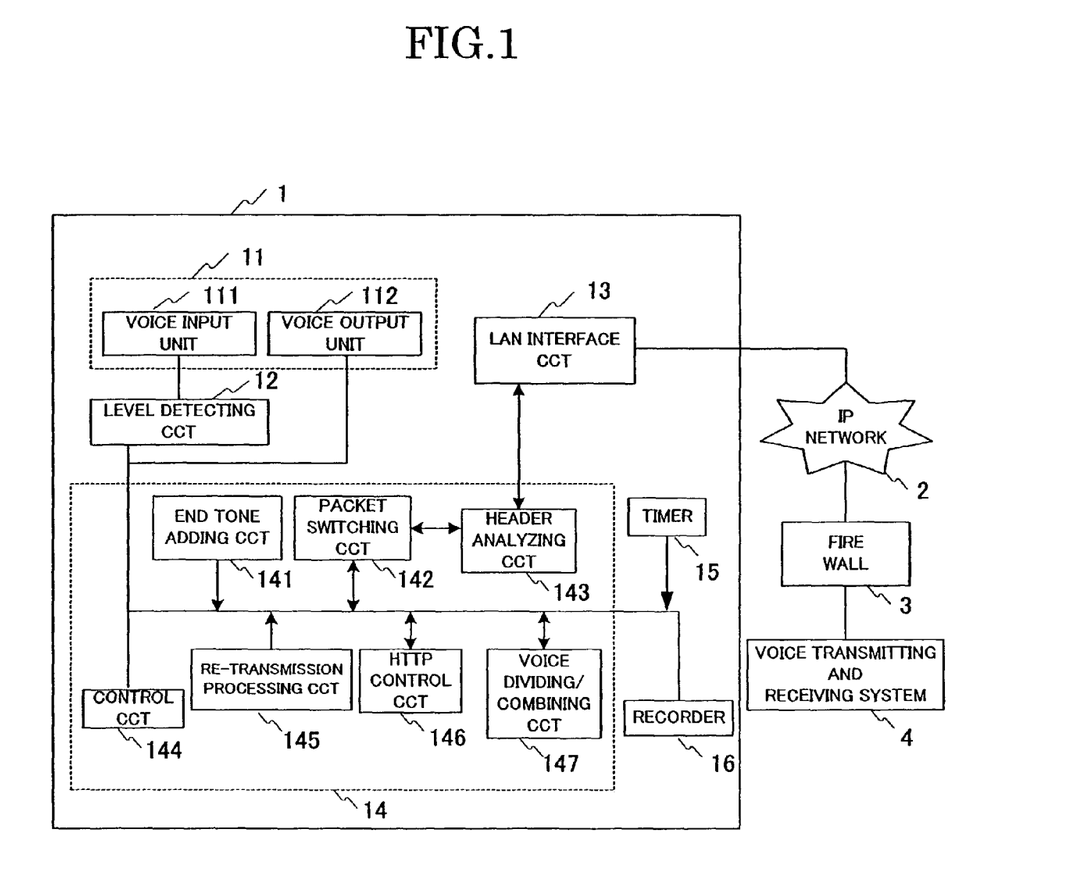
FIG. 1 is a block diagram showing an embodiment of the voice data transmitting and receiving system according to the present invention.

FIG. 1 is a block diagram showing an embodiment of the voice data transmitting and receiving system according to the present invention.

As an example, voice data transmitting and receiving systems 1 and 4 as IP telephone sets are connected via an IP network 2 and a fire wall 3 to each other for voice communication in IP. The voice data transmitting and receiving systems 1 and 4 each comprise a voice input/output block 11, a level detecting circuit 12, an LAN interface circuit 13, a voice processing block 14, a timer 15 and a recorder 16.

The voice input/output block 11 includes a voice input unit 111 such as a microphone and a voice output unit 112 such as a loudspeaker. The voice file processing block 14 is a circuit for processing various voice data, and includes an end tone adding circuit 141 for adding a tone indicative of the end of a voice file to voice data, a packet switching circuit 142 for generating a voice packet by adding a header to voice data, a header analyzing circuit 143 for analyzing the header of the data, a control circuit 144, a re-transmission processing circuit 145 for re-transmitting, after deciding speech quality deterioration based on TCP/IP header data, high loss generation possibility packet data or the like, an HTTP control circuit 146 for adding an HTTP protocol header to the generated voice file, and a voice dividing/combining circuit 147 for dividing voice data when no mute has been detected for more than a time preset in the timer 15.

The control circuit 144 controls the whole voice data transmitting/receiving system 1. As the LAN interface circuit 13 may be used a well-known LAN/IF such as 10 Base-T or 100 Base-T, but it is further possible to use a radio LAN/IF represented by IEEE802.11.

Referring to FIG. 1, data received from the IP network 2 via the LAN interface circuit 13 are coupled to the header analyzing circuit 143 for analyzing the header of the data. When the analyzed header is identical with a predetermined header, the pertinent voice file is judged to be one transmitted in the system according to the present invention, and the voice data containing the identical header are transmitted to and recorded in the recorder 16. When one file data has been accumulated by this data recording, it is coupled to the voice output unit 112 for the voice output.

Meanwhile, communication data are inputted as voice data from the voice input unit 111. The voice data from the voice input unit 111 are coupled to the level detecting circuit 12 for comparison with predetermined thresholds. When the voice data level exceeds a threshold for detecting the speech head in the communication data, it is detected as speech head, while when it becomes less than a threshold for mute detection, it is detected as a mute. The data from the head till the mute thus detected are accumulated in the recorder 16. When the mute is detected, the data are transmitted, with a predetermined HTTP header added in the HTTP control circuit 116, to the opposite side of the communication.

The re-transmission processing circuit 145 judges, with reference to such data as time stamp and number of times of re-transmission per unit time contained in TCP/IP header data obtained in the header analyzing circuit 143, a state that the network channel is so long as to give rise to packet delay and packet losses of voice data and thus deteriorate the channel quality, and re-transmits the pertinent high loss possibility packet together with the immediately preceding packet or the like.

The voice dividing/combining circuit 147 serves to ensure reliable data coupling on the receiving side and thus permit non-interrupted voice communication. The circuit 147 is adapted to solve the problem of re-source in the recorder 16 due to long voice files and prevent increase of delay time due to accumulation time increase. To this end, when a voice file reaches a predetermined length, the circuit 47 divides the voice file to a predetermined size, and transmits each file division together with an added header indicating the file division as such.

Figure 2:
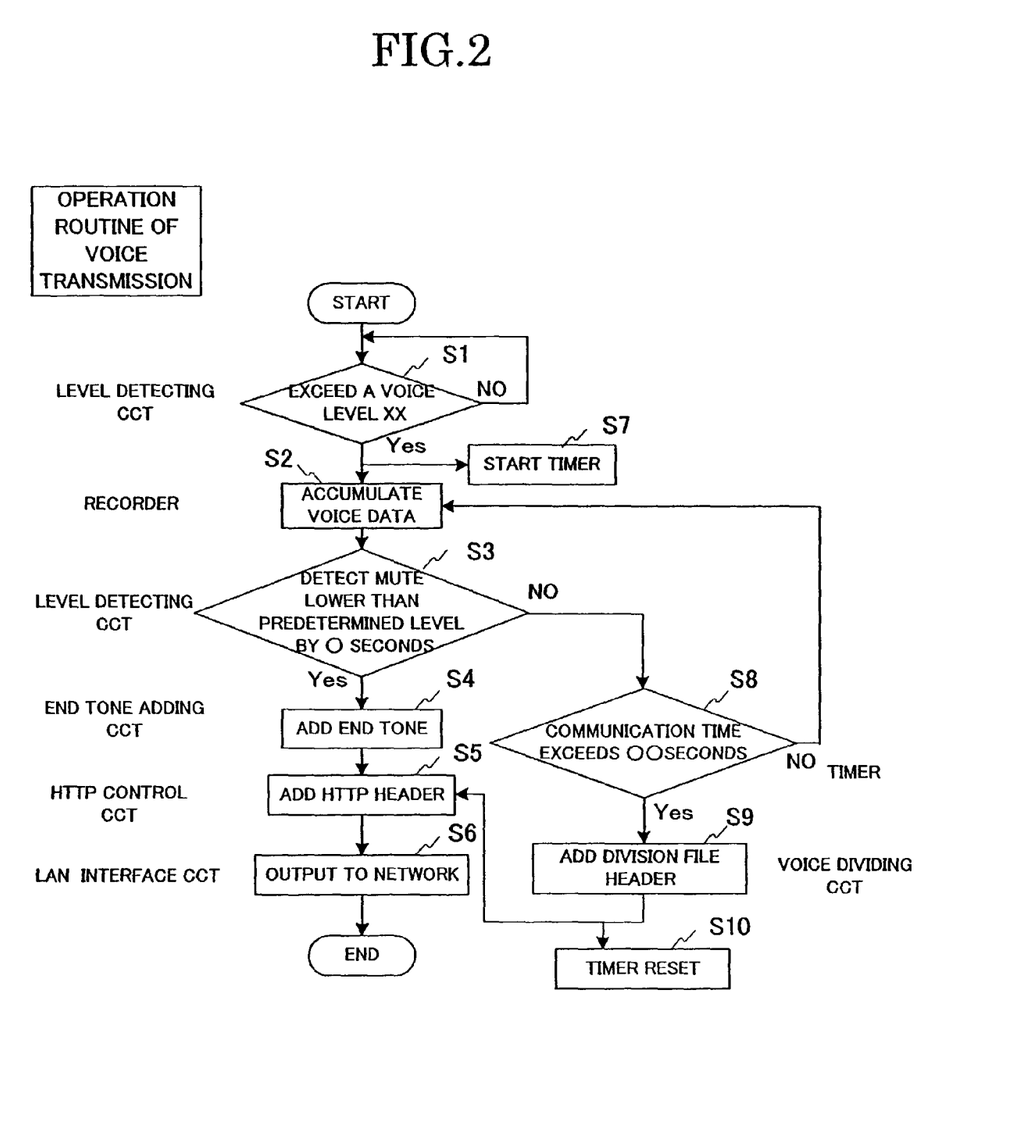
FIGS. 2 and 3 show operation routines at voice transmission and reception times in the embodiment of the present invention.
Figure 3:
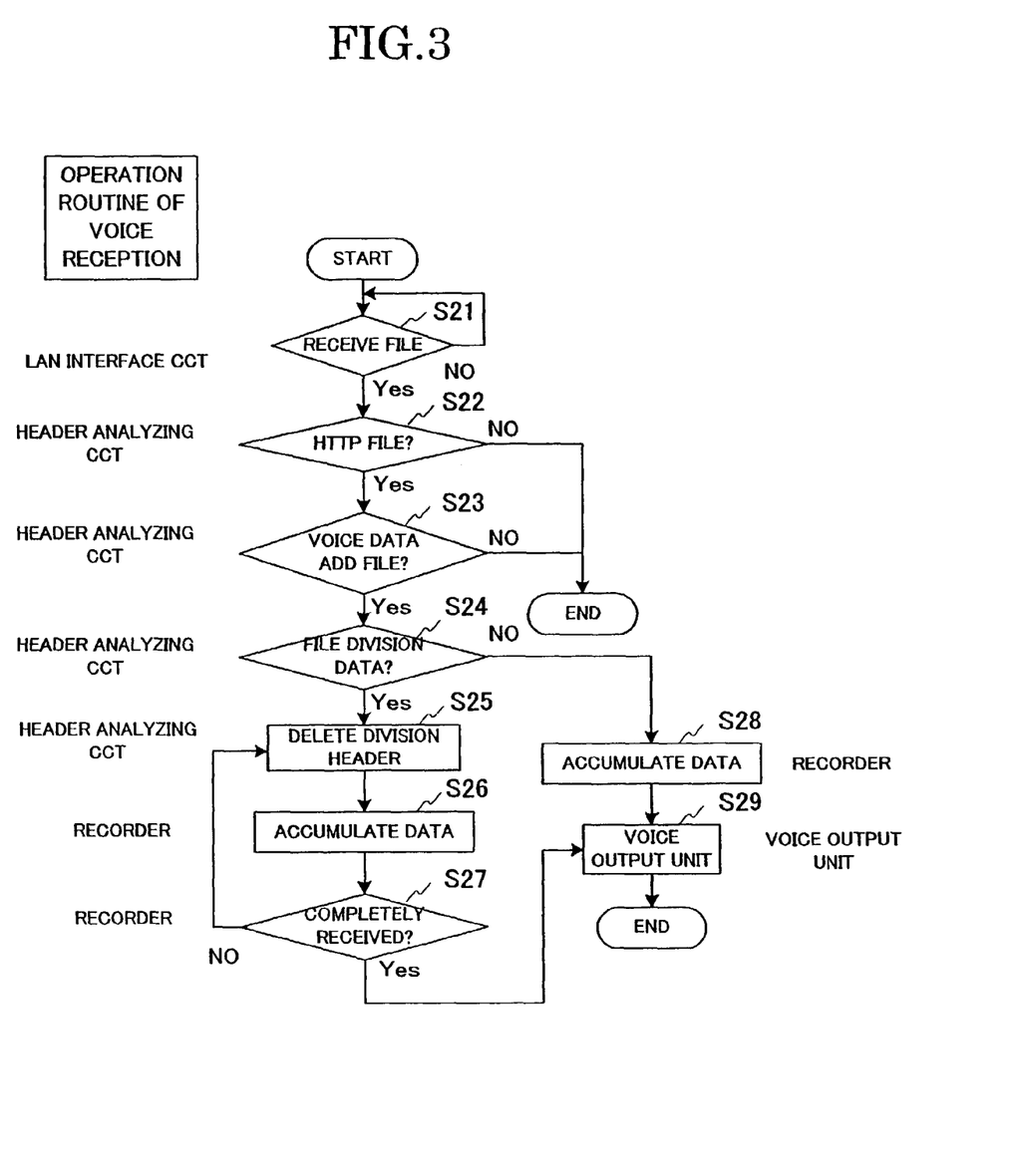

FIGS. 2 and 3 show operation routines at voice transmission and reception times in the embodiment of the present invention.

The construction and operation of the embodiment of the present invention will now be described with reference to FIGS. 1 to 3. At the voice transmission time, as shown in FIG. 2, in the voice data transmitting and receiving system 1 for voice data communication in IP via the IP network such as internet or LAN, voice data for the voice data communication inputted from the voice input unit 111 are transmitted to the level detecting circuit 12. The level detecting circuit 12 monitors the level of the voice data, and when the monitored level exceeds a predetermined level (XX) (step S1), it couples the monitored data as speech start to the recorder 16 for accumulation therein (step S2) and also starts the timer 15 (step S7). When the voice data level has been lower than a predetermined level, the circuit 12 decides the level as mute (step S3), and stops voice data transmission to the recorder 16. Then, the end tone adding circuit 141 adds an end tone as notifying tone to the end of the voice file accumulated in the recorder 16 to notify to the opposite side of communication that the present speech has been transmitted in a communication system based on HTTP (step S4). The HTTP control circuit 146 adds an HTTP protocol header to the generated voice file before transmission thereof (step S5).

The recorder 16 in which voice data from the start till the end of speech have been accumulated, transmits the voice data from the start till the end of the speech as one voice file section to the packet switching circuit 142. The packet switching circuit 142 having received the voice file converts the voice file to an IP packet and couples the IP packet to the LAN interface circuit 13. The LAN interface circuit 13 transmits the packet via the IP network 2 to the opposite side voice data transmitting/receiving system 4 (step S6), thus bringing an end to the routine.

When it is found in the step S3 that no detected mute is present (i.e., the voice data level does not become lower than the predetermined level), the timer 15 is started, and a check is made in a step S8 as to whether a predetermined time (by seconds) has been exceeded by the communication time. When it is found that the predetermined time has been exceeded, the routine goes back to the process of voice data accumulation in the step S2. When it is found that the predetermined time has been exceeded, the voice dividing/combining circuit 147 divides voice data, and adds to the voice data division a division file header indicating that the voice data division is as such (step S9). Then, the timer 15 is reset (step S10), and the routine goes to the step S5, in which the process of adding the HTTP header is executed.

To summarize the above routine, when the level detecting circuit 12 detects the voice input (step S1), the voice data are accumulated in the recorder 16 until the level detecting circuit 12 has detected data from the speech start till the mute in the process in the voice file processing block 14 (step S2), and after the mute detection (step S3), the voice data from the speech start till the mute are made to be a voice file section. The HTTP control circuit 146 for controlling data communication with an HTTP protocol generates an HTTP file from the voice file accumulated in the recorder 16 on the basis of HTTP (step S5). Then, the LAN interface circuit 13 makes data transmission to the opposite side voice data transmitting and receiving system (step S6). As shown, the HTTP communication is made on TCP/IP connection, thus permitting voice communication exceeding fire wall of solid channel and IP network.

The voice file processing block 14 includes the packet re-transmission processing circuit 145. When the network channel is long to result in packet delay and packet losses of the voice data, thus resulting in speech quality deterioration. With TCP/IP header data referred to by the header analyzing circuit 143, the re-transmission processing circuit 145 generates packets including previous packets for re-transmission from time stamp and number of times of re-transmission from unit time and transmits the generated packets.

In the case in which a voice file delay is generated due to IP network transmission quality deterioration or like cause and is causing overlap of the voice file reproduction and the receiving side voice generation over each other to interfere with speech, when a voice file is received during the voice generation, the received data are accumulated in the recorder 16, and after the end of the speech the stored voice data are reproduced, thereby preventing congestion of talks due to the voice file delay.

When congestion of voice file transmission and reception is brought about by delay due to network quality deterioration so that no speech is held, the voice file processing block 14 does not permit transmission and reception of voice files at the same time, but transmits, after the end of the voice file, a packet including a transmission right such as to transmit voice alternately, and the receiving side waits transmission until reception of the packet including the transmission right.

In the meantime, in the voice data transmitting and receiving system 4 having received a voice file transmitted from the voice data transmitting and receiving system 1, as shown in FIG. 3, when the header of the data analyzed in the header analyzing circuit 143 is identical with a predetermined header, the voice data are accumulated in the recorder 16, and when the reception of data as a voice file has been ended, voice is outputted from the voice output unit 112 such as a loudspeaker.

The recorder 16 may couple a received voice file to the voice output unit 112 when a predetermined by the quantity has been received even if the voice file has no been fully received.

In the receiving side voice data transmitting and receiving system 4, the header analyzing circuit 143 analyzes the header of the data received in the step S21, and for separating HTTP file containing voice data and other data it decides, with reference to the obtained header, the data to be HTTP file or voice data file (steps S22 and S23).

When the data is an HTTP file and also a voice-data-added file, the header analyzing circuit 143 checks whether the pertinent file is a file division (step S24). When the data is found to be a file division, the header division is deleted (step S25), the data is accumulated in the recorder 16 (step S26), a check is made as to whether data has been fully received, i.e., whether file division data has been complete (step S27), and the voice data of the predetermined header are accumulated in the recorder 16 (step S28). When data has been fully received, the voice output unit 112 outputs voice (step S29), thus bringing an end to the routine.

When it is found in the steps S22 and S23 that the data is an HTTP file or a voice-data-added file, an end is brought to the routine. When it is judged in the step S24 that the data is other than any file division, data in a predetermined size are stored (step S28), and the data are transmitted to the voice output unit 112 (step S29), so that voice throngs.

Figure 4:
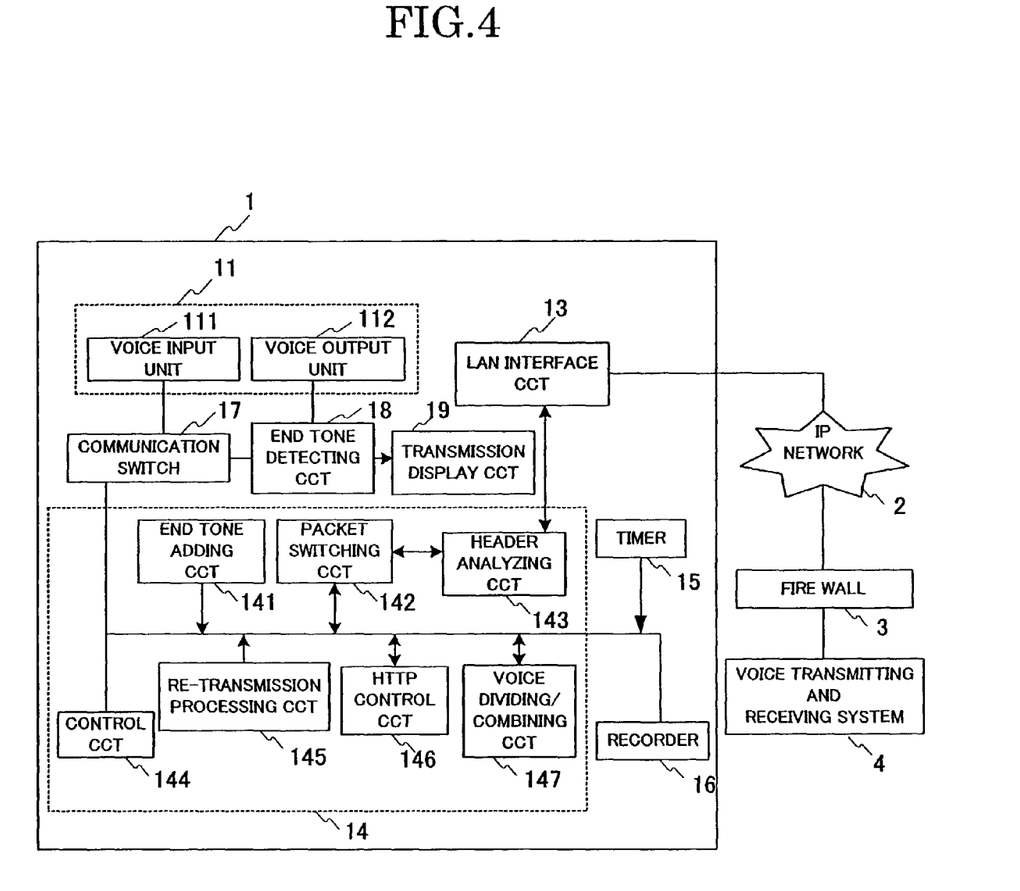
FIG. 4 is a block diagram showing a different embodiment of the voice data transmitting and receiving system according to the present invention.

FIG. 4 is a block diagram showing a different embodiment of the voice data transmitting and receiving system according to the present invention. While in the preceding embodiment the detection of the speech start and mute is performed by the level detecting circuit 12, in this embodiment a switch circuit is provided, which is manually operated by the operator for the start and end of speech transmission.

This embodiment comprises, in lieu of the level detecting circuit 12 in the construction of the embodiment shown in FIG. 1, a communication switch 17, an end tone detecting circuit 18 and a transmission display circuit 19. The voice data transmitting and receiving systems 1 and 4, like those in FIG. 1, each also comprise the voice input/output block 11, the LAN interface circuit 13, the voice file processing block 14, the timer 15 and the recorder 16. Furthermore, like the embodiment shown in FIG. 1, the voice input/output block 11 includes a voice input unit 111 and a voice output unit 112, the voice file processing block 14 includes the end tone adding circuit 141, the packet switching circuit 142, the header analyzing circuit 143, the control circuit 144, the re-transmission processing circuit 145, the HTTP control circuit 146 and the voice dividing/combining circuit 147.

At the time of transmission, the communication switch 17 instructs the vice input start, thus causing input voice signal to be coupled from the voice input unit 111 to the voice file processing block 14. At the receiving time, the output signal from the voice file processing block 14 to be coupled via the end tone detecting circuit 18 to the voice output unit 112. The end tone detecting circuit 18 detects, from the data received via the LAN interface circuit 13, the voice file processing block 14 and the communication switch 17, the end tone added in the transmitting side end tone adding circuit 141, thus detecting that the pertinent voice data transmitting and receiving system to be in a state ready for data transmission, a state ready for data reception, etc. The transmission display circuit 19 makes a display, based on the signal or the like from the end tone detecting circuit 18, as to whether the pertinent voice data transmitting and receiving system is in the state of transmission, the state of reception or any other state.

Figure 5:
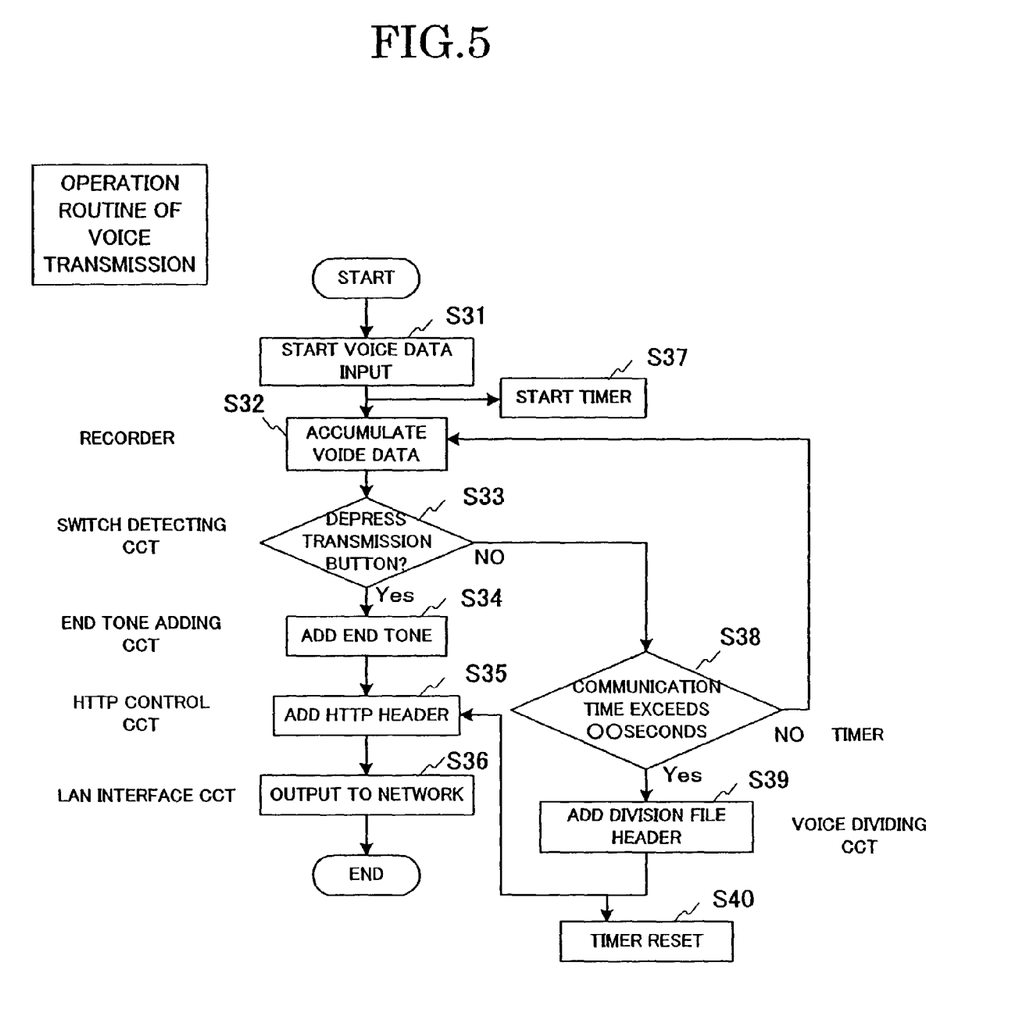
FIG. 5 shows a routine at the time of voice transmission in the embodiment shown in FIG. 4.

FIG. 5 shows a routine at the time of voice transmission in the embodiment shown in FIG. 4. In the procedure shown in FIG. 5, steps S31 to S33 are different from the steps S1 to S3 shown in FIG. 2, and other steps S34 to S40 are the same as the steps S4 to S10 shown in FIG. 2.

When the voice data input is started in the step S31 in FIG. 5 (step S31), voice data are accumulated in the recorder 126 (step S32), and also the timer 15 is started (step S37). When the switch detecting circuit subsequently detects the depression of a transmission button in the communication switch 17 (step S33), the end tone adding circuit 141 adds an end tone (step S34). The HTTP control circuit 146 adds an HTTP protocol header to the generated voice file (step S36).

The recorder 16 having accumulated voice data from speech start till mute, couples the voice data from the speech start till the mute as a voice file section to the packet switching circuit 142. The packet switching circuit 142 having received the voice file converts the voice file to IP packet and transmits the packet to the LAN interface 13. The LAN interface 13 transmits the packet via the IP network 2 to the opposite side voice data transmitting and receiving system 4 (step S36), thus bringing an end to the routine.

When it is not found in the step S33 that the transmission button has not been depressed, the timer 15 is started, and whether a predetermined time (by seconds) has been exceeded by the speech time (step S38). When the predetermined time has not been exceeded, the routine goes back to the process of voice data accumulation in the step S32. When the predetermined time has been exceeded, the voice dividing/combining circuit 147 divides the voice and adds a file division header (step S39). Also, the timer 15 is reset, and the routine goes to the step S35 of executing the HTTP header adding process.

Figure 6:
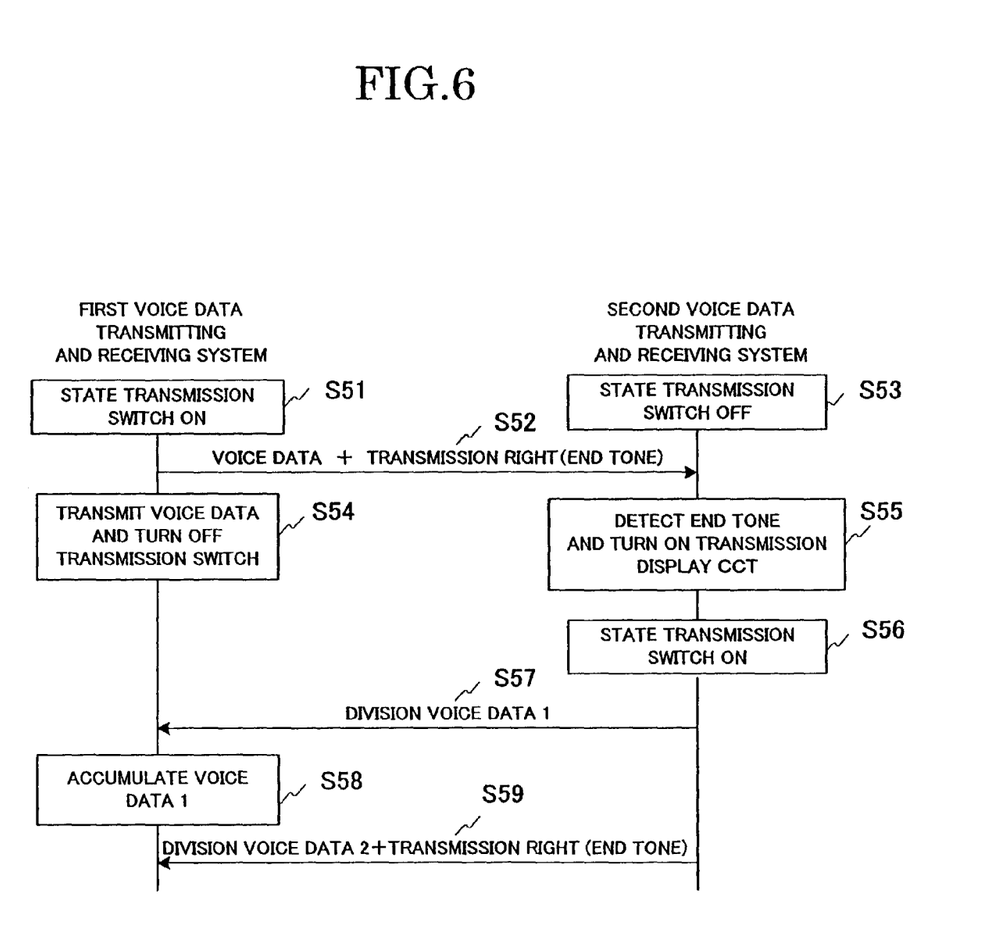
FIG. 6 shows a routine in a further embodiment of the present invention.

FIG. 6 shows a routine in a further embodiment of the present invention. In communication between a first and a second voice data transmitting and receiving system, in response to the turning-on of a state transmission switch in the first voice data transmitting and receiving system (step S51), the data obtained by adding a transmission right (i.e., end tone) to voice data, are transmitted to the second voice data transmitting and receiving system (step S52), and the transmission switch is turned off (step S54).

In the second voice data transmitting and receiving system, the state transmission switch is held "off" (step S53), and in response to the detection of the end tone in the received data the transmission display circuit 1 is turned on (step S55). Then, the state transmission switch is turned on (step S56), and the division voice data 1 are transmitted to the first voice data transmitting and receiving system (step S57). Then, in the first voice data transmitting and receiving system the received voice data are accumulated (step S58). In the second voice data transmitting and receiving system, a transmission right (i.e. end tone) is added to division voice data 2, and the result is transmitted (step S59).

As has been described in the foregoing, in the voice data transmitting and receiving system according to the present invention, voice data from speech start till mute are transmitted as a section voice file to the opposite side voice data transmitting and receiving system, thus permitting voice data transmission free from voice interruption. In addition, it is possible to automatically detect voice data from the speech start till the mute. More specifically, by transmitting voice data from the speech start till the mute it is possible to eliminate packet losses in the data transmission channel and permit voice communication in the same voice quality as in the transmitting side. Besides, because of the use of HTTP communication port it is possible to obtain voice communication exceeding the rooter without any special setting.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A voice data transmitting and receiving system for transmitting and receiving voice data as packet data via a network, the system comprising:
a first transmitting and receiving unit which transmits voice data of a communication voice from a detected speech start in said communication voice till a detected mute in said communication voice as a voice file by packet switching; and
a second transmitting and receiving unit which receives the voice data and outputs the received data,
wherein the voice data are transmitted by adding a given notification tone to an end of the voice file, and
wherein the second transmitting and receiving unit waits until a packet containing a transmission right has been received, said transmission right being included with said packet for alternate voice transmission at the end of the voice file.

2. The voice data transmitting and receiving system according to claim 1, wherein the first transmitting and receiving unit divides the voice file into voice file divisions of a predetermined size if the voice file exceeds a predetermined length, and transmits the voice file by adding a header to each voice file division indicating that each voice file division is a division of said voice file, and the second transmitting and receiving unit combines the voice file divisions based on the header.

3. The voice data transmitting and receiving system according to claim 1, wherein the network is a non-QoS guaranteed network.

4. The voice data transmitting and receiving system according to claim 3, wherein the non-QoS guaranteed network is an internet.

5. A voice data transmitting and receiving system for transmitting and receiving voice data as packet data via a network, the system comprising:
a first transmitting and receiving unit which transmits voice data of a communication voice from a detected speech start in said communication voice till a detected mute in said communication voice as a voice file by packet switching; and
a second transmitting and receiving unit which receives the voice data and outputs the received data,
wherein the voice data are transmitted by adding a given notification tone to an end of the voice file, and
wherein the first transmitting and receiving unit judges high packet loss possibility packet data as such and retransmits the high packet loss possibility packet data together with a preceding packet.

6. A voice data transmitting and receiving system for transmitting and receiving voice data as packet data via a network, the system comprising:
a first transmitting and receiving unit which transmits voice data of a communication voice from a detected speech start in said communication voice till a detected mute in said communication voice as a voice file by packet switching; and a second transmitting and receiving unit which receives the voice data and outputs the received data, wherein the voice data are transmitted by adding a given notification tone to an end of the voice file, wherein the first transmitting and receiving unit adds a header to the voice data, and the second transmitting and receiving unit subjects only voice data, in which the header is detected, to voice processing, and wherein the second transmitting and receiving unit waits until a packet containing a transmission right has been received, said transmission right being included with said packet for alternate voice transmission at the end of the voice file.

7. The voice data transmitting and receiving system according to claim 6, wherein the second transmitting and receiving unit accumulates the received voice data in a recorder, and reproduces the accumulated voice data after the detected mute in the communication voice.

8. A voice data transmitting and receiving system for transmitting and receiving voice data as packet data via a network, the system comprising:

a first transmitting and receiving unit which transmits voice data of a communication voice from a detected speech start in said communication voice till a detected mute in said communication voice as a voice file by packet switching; and a second transmitting and receiving unit which receives the voice data and outputs the received data, wherein the voice data are transmitted by adding a given notification tone to an end of the voice file, wherein the second transmitting and receiving unit accumulates the received voice data in a recorder, and reproduces the accumulated voice data after the detected mute in the communication voice, wherein the second transmitting and receiving unit waits until a packet containing a transmission right has been received, said transmission right being included with said packet for alternate voice transmission at the end of the voice file.

9. A voice data transmitting and receiving system for transmitting and receiving voice data as packet data via a network, the system comprising:

a first transmitting and receiving unit which transmits voice data of a communication voice from a detected speech start in said communication voice till a detected mute in said communication voice as a voice file by packet switching; and a second transmitting and receiving unit which receives the voice data and outputs the received data, wherein the voice data are transmitted by adding a given notification tone to an end of the voice file, wherein the voice data are transmitted with an HTTP protocol, wherein the first transmitting and receiving unit transmits the HTTP file by adding a header defined exclusively for voice, and the second transmitting and receiving unit separates the HTTP file containing the voice data and other data from the header in the HTTP file, wherein the second transmitting and receiving unit waits until a packet containing a transmission right has been received, said transmission right being included with said packet for alternate voice transmission at the end of the voice file.

10. The voice data transmitting and receiving system according to claim 1, wherein the first transmitting and receiving unit divides the voice file into voice file divisions of a predetermined size if the voice file exceeds a predetermined length, and transmits the voice file by adding a header to each voice file division indicating that each voice file division is a division of said voice file, and the second transmitting and receiving unit combines the voice file divisions based on the header.

11. The voice data transmitting and receiving system according to claim 1, wherein the network is a non-QoS guaranteed network.

12. The voice data transmitting and receiving system according to claim 1, wherein the voice data are transmitted with an HTTP protocol.

13. The voice data transmitting and receiving system according to claim 6, wherein the voice data are transmitted with an HTTP protocol.

14. The voice data transmitting and receiving system according to claim 8, wherein the voice data are transmitted with an HTTP protocol.

* * * * *